(12) United States Patent
Froitzheim

(10) Patent No.: US 7,277,008 B2
(45) Date of Patent: Oct. 2, 2007

(54) SENSOR UNIT, METHOD, DEVICE AND SENSOR SYSTEM FOR DETERMINING A SIDE OF A VEHICLE ON WHICH A WHEEL WITH A SENSOR UNIT IS DISPOSED

(75) Inventor: Herbert Froitzheim, Pettendorf (DE)

(73) Assignee: Siemens Aktiengesellschaft, Munich (DE)

( * ) Notice: Subject to any disclaimer, the term of this patent is extended or adjusted under 35 U.S.C. 154(b) by 210 days.

(21) Appl. No.: 11/203,873

(22) Filed: Aug. 15, 2005

(65) Prior Publication Data

US 2006/0033611 A1 Feb. 16, 2006

(30) Foreign Application Priority Data

Aug. 13, 2004 (DE) .................. 10 2004 039 405

(51) Int. Cl.
*B60R 25/10* (2006.01)
(52) U.S. Cl. ............ 340/426.33; 340/442; 340/444; 340/443; 116/34 R
(58) Field of Classification Search ........... 340/426.33, 340/442, 443, 444; 116/34 R, 34 B, 35 R
See application file for complete search history.

(56) References Cited

U.S. PATENT DOCUMENTS

| 4,637,253 | A | 1/1987 | Sekimura et al. |
| 4,843,880 | A | 7/1989 | Sommer |
| 6,446,502 | B1 | 9/2002 | Normann et al. |
| 6,535,116 | B1 * | 3/2003 | Zhou ................. 340/447 |
| 6,633,229 | B1 | 10/2003 | Normann et al. |
| 6,690,271 | B2 | 2/2004 | Fischer et al. |
| 2003/0020604 | A1 | 1/2003 | Fischer et al. |
| 2004/0231776 | A1* | 11/2004 | Skoff ................. 152/416 |
| 2006/0254688 | A1* | 11/2006 | Tanaka ............... 152/518 |

FOREIGN PATENT DOCUMENTS

| DE | 35 18 409 C2 | 11/1985 |
| DE | 36 04 335 A1 | 9/1987 |
| DE | 198 56 861 A1 | 6/2000 |
| DE | 101 35 936 A1 | 2/2003 |
| EP | 0 760 299 A1 | 3/1997 |
| EP | 1 003 647 B1 | 5/2000 |

* cited by examiner

*Primary Examiner*—Jeffery Hofsass
*Assistant Examiner*—Hoi C. Lau
(74) *Attorney, Agent, or Firm*—Laurence Greenberg; Werner H. Stemer; Ralph E. Locher

(57) ABSTRACT

A sensor unit for recording the direction of rotation of a wheel is embodied to record a variable that is characteristic for a direction of flow of an air stream in a tire of the wheel. To determine a side of a vehicle on which a wheel is disposed, a variable is recorded which is characteristic for a direction of flow of an air stream in a tire of the wheel. Further a direction of movement and an acceleration of the vehicle is recorded. The side of the vehicle is determined depending on the variable, the direction of movement of the vehicle and the acceleration of the vehicle.

9 Claims, 2 Drawing Sheets

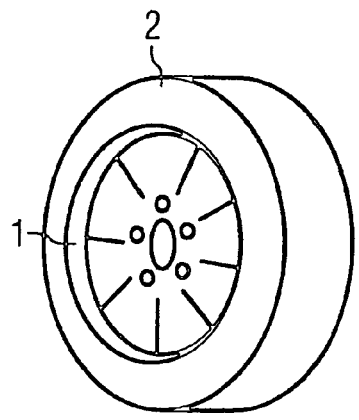
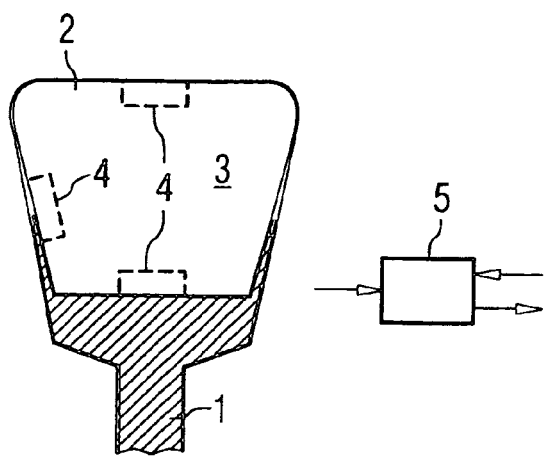
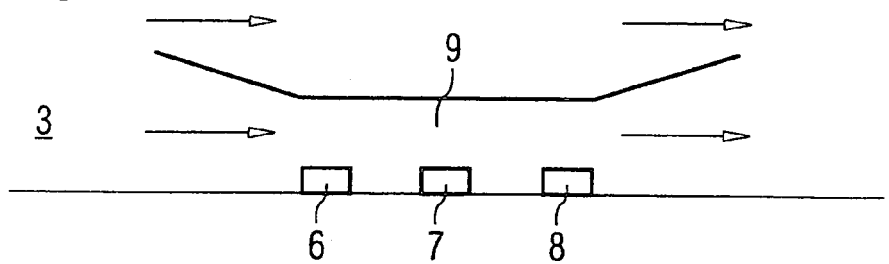
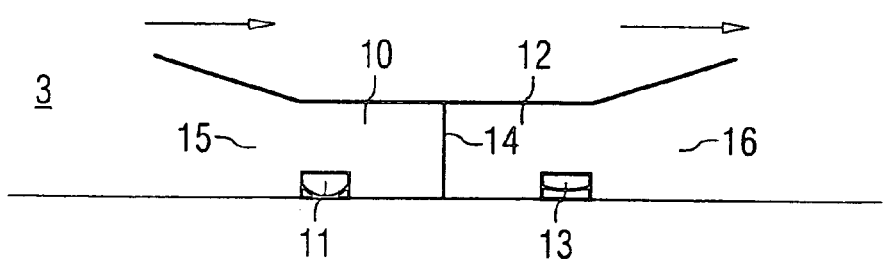
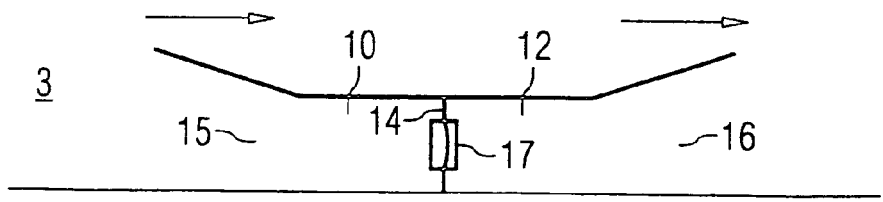

SENSOR UNIT, METHOD, DEVICE AND SENSOR SYSTEM FOR DETERMINING A SIDE OF A VEHICLE ON WHICH A WHEEL WITH A SENSOR UNIT IS DISPOSED

BACKGROUND OF THE INVENTION

Field of the Invention

The invention relates to a sensor unit for recording a direction of rotation of a wheel, a method and a device for determining on which side of a vehicle the wheel with the sensor unit is disposed, and a sensor system with at least one sensor unit and a device.

The monitoring of parameters of a wheel of a vehicle can make a decisive contribution to the safety of the occupants traveling in the vehicle. In such cases monitoring the tire pressure in particular is of great importance. To enable the driver of a vehicle to be made aware of tire pressure that is too low in one of the tires of the vehicle, the position of the wheel on the vehicle must be determined.

A device for monitoring at least one parameter for a number of vehicle tires is known from published, non-prosecuted German patent application No. DE 101 35 936 A1 (corresponding to U.S. Pat. No. 6,690,271 B2 and U.S. patent publication No. 2003/0020604 A1). The device is assigned detector units on each wheel, each of which has a transmitter unit that transmits a phase-modulated or frequency-modulated signal to a central evaluation and control unit. Each detector unit transmits a short signal at specific intervals that contains a unique identifier. After a wheel is changed a new assignment of the relevant detector unit to the relevant wheel position can be undertaken in an assignment mode of the detector unit and the central evaluation and control unit in that, for each detector unit, a graph of the average receive power as a function of the angular position of the relevant wheel is recorded and compared with stored signature information.

European Patent EP 1 003 647 B1 (corresponding to U.S. Pat. No. 6,446,502 B1) discloses a method for assigning identifiers to the positions of wheels of a vehicle. Transmitters of a tire pressure monitoring system, which send out identifiers, are disposed in the wheels. In addition to the air pressure in the tire, a road acceleration produced by the movement status of the wheel concerned is recorded and the road acceleration signal derived from this is signaled by the relevant transmitter to receiver and evaluation electronics. Information contained in the road acceleration signal about the position of the relevant wheel is evaluated. To distinguish between wheels on the right-hand and the left-hand side of the vehicle the leading sign of the road acceleration coming out of the wheel is determined in an evaluation circuit provided on the wheel during the acceleration phase after the vehicle has started.

A device is known from published, European patent application EP 0 760 299 A1 for a tire pressure checking system for vehicles. The device has sensors on each wheel that transfer information to an evaluation unit disposed on the vehicle. Each sensor unit features a sensor for recording the direction of rotation of the wheel assigned to it and transfers the information about the direction of rotation to the evaluation device.

Sensor units disposed in the wheels, which are used to determine the side of the vehicle on which the relevant sensor unit is disposed, contain mechanical acceleration sensors or roll switches with moving parts which are subject to mechanical wear and which are expensive to integrate into the sensor unit.

Sensors are known from German patent Nos. DE 35 18 409 C2 (corresponding to U.S. Pat. No. 4,637,253) and DE 36 04 335 A1 (corresponding to U.S. Pat. No. 4,843,880) which record the direction of flow of an air stream for example, using indirect measurement methods (temperature measurement or pressure measurement).

Finally reference should also be made to published, non-prosecuted German patent application DE 198 56 861 A1 (corresponding to U.S. Pat. No. 6,633,229 B1) from which a method is known for determining the vehicle side on which the wheel is disposed from which the sent sensor signal originates. A variable is recorded which is characteristic of the direction of rotation of the wheel (leading sign of the road acceleration) and records the acceleration of the vehicle (centrifugal acceleration). To enable the leading sign of the road acceleration to be evaluated accordingly the direction of travel of the vehicle must be known.

SUMMARY OF THE INVENTION

It is accordingly an object of the invention to provide a sensor unit, a method, a device and a sensor system for determining a side of a vehicle on which a wheel with a sensor unit is disposed which overcomes the above-mentioned disadvantages of the prior art devices and methods of this general type, with which a direction of rotation of a wheel can be recorded in a simple manner and a method, a device and a sensor system with which it is easy to determine on which side of a vehicle the wheel is disposed.

In accordance with a first aspect the invention is distinguished by a sensor unit for recording a direction of rotation of a wheel, the unit being embodied to record a variable which is characteristic for a direction of flow of an air stream in a tire of the wheel. During a rotational acceleration of the wheel air that is to be found in a tire is also accelerated because of friction. Since the air mass present in the tire is an "inert mass" which follows the tire during its rotational acceleration, a speed of the air in the tire differs during the rotational acceleration from the rotational speed of the tire. This produces an air flow in the tire. The variable which is characteristic of the direction of flow of the air flow in the tire can be used to record the direction of rotation of the wheel. The direction of the air flow can be recorded without complex mechanical components and without moving parts. The sensor unit for example does not require an acceleration sensor and the mechanical and electrical overhead is small.

In an advantageous embodiment of the sensor unit the sensor unit contains a first and a second temperature sensor and a heating element. The first and the second temperature sensor and the heating element are disposed so that, for a first direction of flow, the flow first passes over a surface of the first temperature sensor, then of the heating element and subsequently of the second temperature sensor, and for a second direction of flow, the flow first passes over the surface of the second temperature sensor, then of the heating element and subsequently of the first temperature sensor. The advantage of this is that the sensor unit requires no mechanical components or moving parts and that the temperature sensors and the heating element can be simply and cheaply manufactured as an integrated circuit or can be integrated as components into the integrated circuit. This makes it possible to configure the sensor unit to be very small. Further it is very easy to deduce the direction of flow of the air stream in the tire from the recorded temperature signals from the first and the second temperature sensor, since the temperature sensor disposed downstream in the flow records a higher temperature than the temperature sensor disposed upstream.

In this context it is advantageous for the first and the second temperature sensor and a heating element in the sensor unit to be disposed in an air channel which is embodied so that an air mass which flows over the first and the second temperature sensor and the heating element is small. The heating element therefore only needs to heat up a small mass of air. The consequence of this is that the heating power of the heating element can be reduced and thus the sensor unit has a very low demand for electrical energy. This is especially of advantage if there is only a small amount of electrical energy available in the sensor unit, as is the case for example with battery-operated transponders or transponders supplied with energy using inductive coupling.

In a further advantageous embodiment of the sensor unit a first Pitot chamber is provided, in which a first pressure sensor is disposed which is embodied for determining a first pressure. The first Pitot chamber has a cutout that is disposed such the first pressure determined depends on the direction of flow of the air stream. Depending on whether the air stream is directed into the first Pitot chamber or out of the first Pitot chamber, the first pressure is greater than or less than a pressure which is recorded if no air is flowing into the Pitot chamber or out of it. The advantage is that a pressure sensor can be used which is already provided for recording a tire pressure and only the first Pitot chamber is required in addition. Furthermore it is possible to integrate the pressure sensor into an integrated circuit. This makes it possible to configure the sensor unit to be very small. The pressure sensor also requires little energy.

In this context it is advantageous, if for the sensor unit a second Pitot chamber is provided in which a second pressure sensor is disposed which is embodied for determining a second pressure. The second Pitot chamber has a second cutout that is disposed so that the second pressure determined, depending on the direction of flow of the air stream, is the reverse of the first pressure in the first Pitot chamber. Forming the difference between the first pressure and the second pressure enables the accuracy of the recorded direction of flow of the air stream to be improved. Furthermore the average value of the first pressure and the second pressure is equal to a static tire pressure that can be used to monitor the tire pressure.

In a further advantageous embodiment of the sensor unit a first Pitot chamber and a second Pitot chamber are provided in the sensor unit which feature a shared wall. A differential pressure sensor is disposed in a shared wall to determine the differential pressure between a first pressure in the first Pitot chamber and a second pressure in the second Pitot chamber depending on the direction of flow of the air stream in the tire. The advantage of this is that only one pressure sensor is required and that only a little energy is needed.

In accordance with a second aspect, a distinguishing feature of the invention is a method and a corresponding device to determine a side of the vehicle on which a wheel is disposed. With the method a variable is recorded which is characteristic for a direction of flow of an air stream in a tire of the wheel. Further a direction of movement and an acceleration of the vehicle is recorded. The side of the vehicle is determined on which the wheel is disposed depending on the variable, the direction of movement of the vehicle and the acceleration of the vehicle. This enables the side of the vehicle to be established on which the relevant wheel is disposed in a simple manner.

In accordance with a third aspect, a distinguishing feature of the invention is a sensor system to determine a side of a vehicle on which a wheel is disposed which contains at least one sensor unit disposed on a wheel of the vehicle in each case and a device for determining a side of a vehicle on which a wheel is disposed.

Other features which are considered as characteristic for the invention are set forth in the appended claims.

Although the invention is illustrated and described herein as embodied in a sensor unit, a method, a device and a sensor system for determining a side of a vehicle on which a wheel with a sensor unit is disposed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1A is a diagrammatic, perspective view of a wheel;
FIG. 1B is a diagrammatic, cross-sectional view through a part of the wheel and an evaluation unit;
FIG. 2 is an illustration of a sensor unit;
FIG. 3 is an illustration of a second embodiment of the sensor unit;
FIG. 4 is an illustration of a third embodiment of the sensor unit.

DESCRIPTION OF THE PREFERRED EMBODIMENTS

Figure 5:
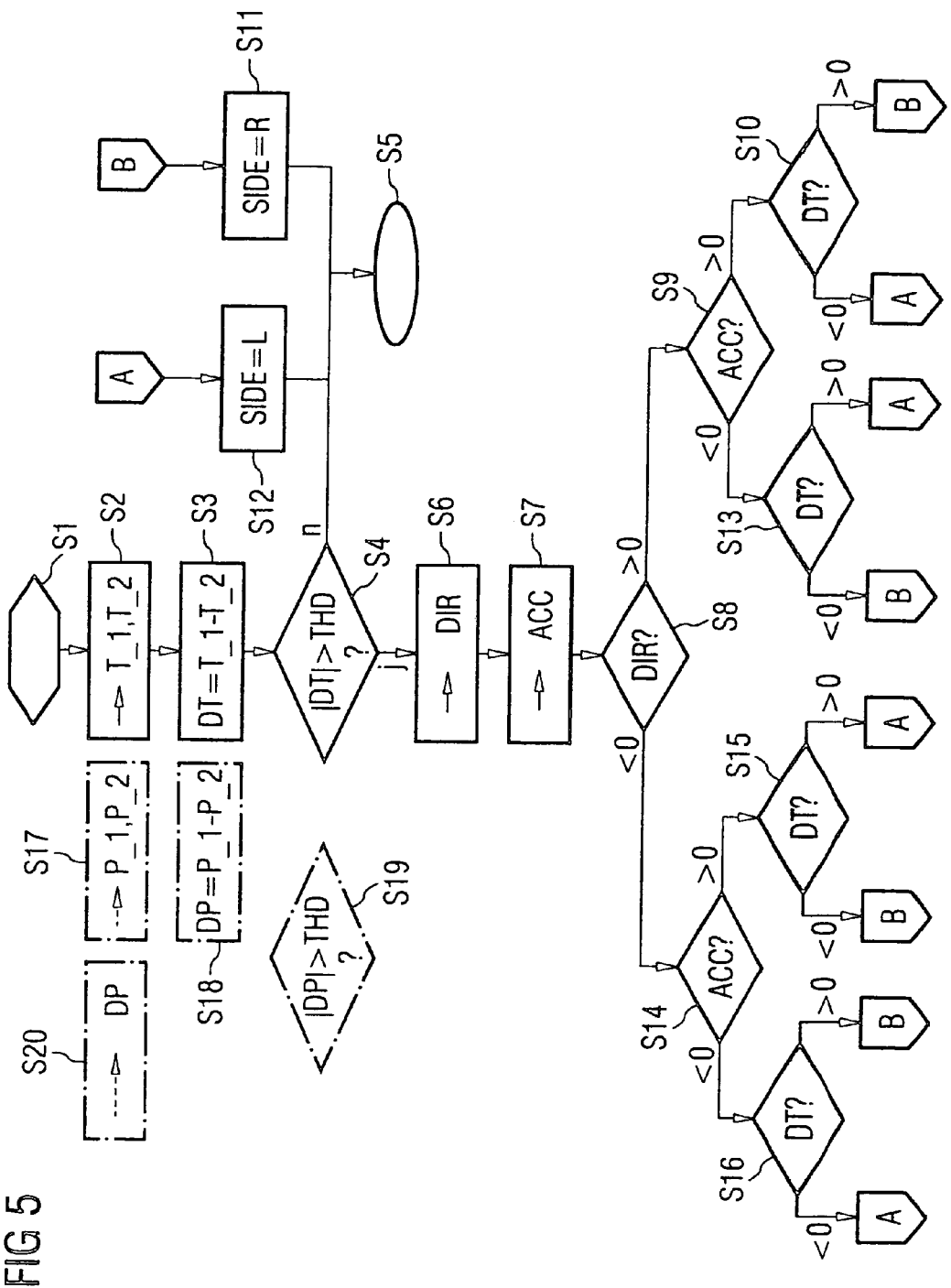
FIG. 5 is a flowchart.

In all the figures of the drawing, sub-features and integral parts that correspond to one another bear the same reference symbol in each case. Referring now to the figures of the drawing in detail and first, particularly, to FIG. 1A thereof, there is shown a wheel of a vehicle with a rim 1 and a tire 2.

FIG. 1B shows a cross-section view through a part of the wheel. The tire 2 makes an airtight seal on the rim 1 and is filled with air 3. In the tire 2 or on the rim 1, a sensor unit 4 is disposed so that the air 3 in the tire 2 has contact with a surface of the sensor unit 4. In FIG. 1B three alternative positions for the configuration of the sensor unit 4 on the rim 1 or in the tire 2 are shown.

Furthermore an evaluation unit 5 is provided which is coupled to the sensor unit 4 and receives information from the sensor unit 4. The evaluation unit 5 is disposed in the vehicle and is preferably coupled to all the relevant sensor units 4 of all wheels of the vehicle. The sensor unit 4 and the evaluation unit 5 can for example be connected by a radio connection or by inductive coupling. The evaluation unit 5 can however also be disposed in the sensor unit 4. The evaluation unit 5 is embodied for determining a side of the vehicle on which the relevant wheel with the sensor unit 4 is disposed.

The wheels of the vehicle are accelerated with the vehicle and a rotational movement is initiated, i.e. a tangential acceleration of the wheels which is referred to below as rotational acceleration, depending on an acceleration ACC of the vehicle. The air 3 in the tire 2 of the wheel is an "inert mass", which is also accelerated. The speed of the air 3, as a result of its inertness, follows the speed of rotation of the wheel. This produces an air stream of the air 3 relative to the rim 1 and the tire 2. A direction of flow of the air stream is dependent on the rotational acceleration of the wheel. The sensor unit 4 records a variable which is characteristic of the direction of flow of the air stream in the tire of the wheel. The variable is fed to the evaluation unit 5, which, depending on the variable and the direction of movement DIR of the vehicle and the acceleration ACC of the vehicle, determines the side SIDE of the vehicle on which the relevant wheel with the sensor unit 4 is disposed.

FIG. 2 shows a first embodiment of the sensor unit 4 which includes a first temperature sensor 6 which records a first temperature $T\_1$, a heating element 7 and a second temperature sensor 8 which records a second temperature $T\_2$. Depending on the direction of flow of the air stream, the flow first passes over a surface of the first temperature sensor 6, then a heating element 7 and subsequently the second temperature sensor 8 or first passes over the surface of the second temperature sensor 8, then the heating element 7 and subsequently the first temperature sensor 6. The temperature sensor disposed downstream from the heating element 7 in each case records a higher temperature than the temperature sensor disposed on the upstream side. To this end it is necessary for the heating element 7 to heat the air 3 which flows over the first temperature sensor 6, the heating element 7 and the second temperature sensor 8 to the extent that there is a temperature difference DT between the first temperature $T\_1$ recorded either upstream or downstream of the heating element 7 and the second temperature $T\_2$ which is large enough for the direction of flow of the air stream to be able to be reliably recorded.

In this context it is advantageous for there only to be a small space between the first temperature sensor 6, the heating element 7 and the second temperature sensor 8, to prevent the air stream from cooling down between the heating element 7 and temperature sensor disposed downstream from it. In addition it is advantageous, if an air mass flowing over one surface of the sensor element 4 is so small that the air mass can be sufficiently heated up with a very small heat output of the heating element 7 to enable the direction of flow of the air stream to be reliably recorded. This can be achieved for example by disposing the first temperature sensor 6, the heating element 7 and the second temperature sensor 8 in an air channel 9. The smaller the mass of air to be heated up, the smaller is the required heat output of the heating element 7 and thereby the energy requirement of the sensor device 4. If for example the sensor unit 4 contains an electronic circuit which is embodied for example for pre-processing of the first or the second temperature $T\_1$, $T\_2$ or for transmission of the first of the second temperature $T\_1$, $T\_2$ or the temperature difference DT to the evaluation unit 5, then this electronic circuit can also be used as the heating element 7 if this exhibits a sufficiently high power dissipation for example. In this case no additional energy is required for heating up the air 3.

The temperature difference DT or the first and the second temperature $T\_1$, $T\_2$ are characteristic for the direction of flow of the air stream.

The first temperature sensor 6, the heating element 7 and the second temperature sensor 8 can be embodied as an integrated component or together with electronic circuit in an integrated circuit. This makes it possible to embody the sensor unit 4 to be very small, with the size of a few millimeters or even less than one millimeter for example.

The air channel 9 is preferably also embodied in these orders of magnitude. In addition such a sensor unit can be manufactured simply and cheaply in large volumes.

FIG. 3 shows a second embodiment of the sensor unit 4 with a first Pitot chamber 10 in which a first pressure sensor 11 is disposed, and a second Pitot chamber 12 in which a second pressure sensor 13 is disposed and which is separated from the first Pitot chamber 10 by a wall 14. The first Pitot chamber 10 features a first cutout 15 and the second Pitot chamber 12 features a second cutout 16. Depending on the direction of flow of the air stream in the tire 2, the first cutout 15 is aligned to the upstream side and the second cutout 16 to the downstream side or the second cutout 16 to the upstream side and the first cutout 15 to the downstream side. If the air flows into the first Pitot chamber 10 through the first cutout 15, the first pressure sensor 11 records a higher pressure than the second pressure sensor 13. Correspondingly the second pressure sensor 13 records a higher pressure than the first pressure sensor 11 if the flow through the second Pitot chamber 12 is through the second cutout 16. The chamber wall 14 prevents the air from the first Pitot chamber 10 being able to enter the second Pitot chamber 12 or vice-versa. A pressure difference DP of a first pressure $P\_1$ which is recorded with the first pressure sensor 11 and a second pressure $P\_2$ which is recorded with the second pressure sensor 13 is characteristic for the direction of flow of the air stream in the tire 2. An average value of the first pressure $P\_1$ and the second pressure $P\_2$ corresponds to a static tire pressure in the tire 2 and can be used for monitoring the tire pressure.

It is likewise possible for only the first Pitot chamber 10 with the first pressure sensor 11, the first cutout 15 and the Pitot chamber wall 14 or only the second Pitot chamber 12 with the second pressure sensor, the second cutout 16 and Pitot chamber wall 14 to be provided. The first pressure $P\_1$ or the second pressure $P\_2$ is then characteristic for the direction of flow of the air stream in the tire 2. To record the static tire pressure a further pressure sensor can be provided or the static tire pressure can be recorded either with the first pressure sensor 11 or with the second pressure sensor 13 if no air stream in the tire 2 changes the recorded first or second pressure $P\_1$, $P\_2$ in relation to the static tire pressure, for example if the wheel is not turning.

The first pressure sensor 11 and the second pressure sensor 13 can be embodied as an integrated circuit or can be integrated into an integrated circuit. Therefore, the sensor unit 4 can be embodied compactly and is simple and cheap to manufacture in large volumes.

FIG. 4 shows a third embodiment the sensor unit 4. The sensor unit 4 includes the first Pitot chamber 10 with the first cutout 15 and the second Pitot chamber 12 with the second cutout 16. Furthermore the sensor unit 4 contains the Pitot chamber wall in which a differential pressure sensor 17 is disposed which records the differential pressure DP between the pressure in the first Pitot chamber 10 and the second Pitot chamber 12. The recorded differential pressure DP is characteristic for the direction of flow of the air stream in the tire 2.

FIG. 5 shows a flowchart for a method for determining the side SIDE of the vehicle on which the wheel with the sensor unit 4 shown in FIG. 2 is disposed. The method begins in step S1, in which if necessary preparations are made or conditions are checked which are required to determine the side SIDE of the vehicle. For example it is necessary for the relevant wheel of the vehicle to be turning and for the wheel to be accelerated.

In step S2 the first temperature T_1 and the second temperature T_2 are recorded. In step S3 the temperature difference DT is determined from a difference between the first temperature T_1 and the second temperature T_2. In step S4 a check is subsequently made as to whether an amount of the temperature difference DT is greater than a threshold value THD. If the condition is not fulfilled, the side SIDE of the vehicle cannot be reliably determined and the program execution is ended in step S5.

If the condition in the step S4 is however fulfilled, then in step S6 the direction of movement DIR of the vehicle is recorded, meaning whether the vehicle is moving forwards or backwards. This can for example be done as a function of whether the reverse gear of the vehicle is engaged. In addition the direction of movement DIR can be determined statistically using a period of time since the vehicle is usually moving forwards for a longer period of time than it is moving in reverse.

In step S7 an acceleration ACC of the vehicle is recorded. The accelerations ACC of the vehicle can for example be recorded by an acceleration sensor. Alternatively a check can be made as to whether the accelerator pedal is being actuated, which for example can lead to a positive acceleration ACC, or whether a brake is being actuated, which can lead to a negative acceleration ACC.

In step S8 the direction of movement DIR recorded is checked to see whether the vehicle is moving forwards or backwards. If the vehicle is moving forwards, then the recorded direction of movement DIR is greater than zero. In step S9 a check is then made as to whether the vehicle is speeding up, i.e. the acceleration ACC is thus greater than zero, or whether the vehicle is slowing down, i.e. the acceleration ACC is thus less than zero. If the vehicle speeds up then a check is made in step S10 as to whether the temperature difference DT is greater than or less than zero. If the temperature difference DT is greater than zero, then in step S11 a right side R is detected as the side SIDE of the vehicle and the program execution sequence ended in step S5. If the temperature difference DT in the step S10 is however less than zero, then in step S12 a left side L is detected as the side SIDE of the vehicle and the program execution sequence is ended in step S5.

If the accelerations ACC in step S9 is less than zero, then in step S13 the temperature difference DT is checked. If the temperature difference DT is greater than zero, then the program execution sequence is continued in step S12, i.e. the left side L is detected. However if the temperature difference DT is smaller than zero, then the program execution sequence is continued in the step S11, i.e. the right side R is detected.

If the vehicle is moving backwards, i.e. the direction of movement DIR is smaller than zero, then a check is made in a step S14 as to whether the vehicle is speeding up, that is the acceleration ACC is greater than zero, or is slowing down, that is the acceleration ACC is less than zero. If the vehicle is speeding up, then in step S15 the temperature difference DT is checked. Depending on the temperature difference DT the left side L of the vehicle is detected in the step S12 if the temperature difference DT is greater than zero, or in the step S11 the right side R is detected if the temperature difference DT is less than zero. If however the vehicle is slowing down, that is if in the step S14 the acceleration ACC is less than zero, then in step S16 the temperature difference DT is again checked. The right side R is detected in step S11 if the temperature difference DT is greater than zero. Otherwise the left side L is detected in step S12 if the temperature difference DT is less than zero.

Alternatively, the method can also be performed with the sensor device 4 shown in FIG. 3. The step S2 is then replaced by step S17 in which the first pressure P_1 and the second pressure P_2 are recorded. The step S3 is replaced by step S18, in which the pressure difference DP is determined from a difference of the first pressure P_1 and the second pressure P_2. The step S4 is replaced by step S19, in which a check is made as to whether an amount of the pressure difference DP is greater than the threshold value THD. If the condition is fulfilled, the program execution sequence is continued in step S6, otherwise the program execution sequence is ended in step S5. In the steps S10, S13, S15 and S16, instead of the temperature difference DT the pressure difference DP is checked and the program execution sequence is accordingly continued.

The method can also be correspondingly executed with the sensor unit shown in FIG. 4. Step S2 is then replaced by step S20. Since the differential pressure sensor 17 records the pressure difference DP, step S3 can be omitted and the program execution sequence can be continued, as described above, in step S19. Accordingly in the steps S10, S13, S15 and S16, instead of the temperature difference DT the pressure difference DP is checked and the program execution sequence continued accordingly.

The acceleration ACC of the vehicle behaves in approximately the same way as the rotational acceleration of the wheels of the vehicle i.e. if the wheels accelerate, then the vehicle also accelerates and vice versa. Steps S1 to S20 are for example executed in the evaluation unit 5. In the steps S2, S17 or S20 for example the first and second temperature T_1, T_2, the first and second pressure P_1, P_2 or the pressure difference DP are received from the sensor unit 4, which is embodied as a transponder for example.

The side SIDE of the vehicle determined for the sensor units 4 which are disposed in the wheels of the vehicle, can for example be used to provide the driver of the vehicle or a supervision device in the vehicle with a tire pressure or a tire temperature recorded in the tire 2, in order to enable them to be made aware in good time for example of a damaged tire, taking into account the position of the relevant wheel on the vehicle.

The sensor unit 4 is preferably embodied to record the tire pressure and the tire temperature and the evaluation unit 5 is preferably embodied to monitor the tire pressure and the tire temperature.

The steps S2, S17 or S20 and S6 and S7 can also be executed in another order. All steps should however be executed within a period of time in which the direction of flow of the air stream in the tire 2, the direction of movement DIR of the vehicle and the leading sign of the acceleration ACC of the vehicle do not change.

The sensor unit 4 is preferably disposed oriented in the same direction in all wheels of the vehicle regardless of the position of the relevant wheel on the vehicle. The recorded direction of flow of the air stream in the tire 2, and thereby also the leading sign of the temperature difference DT or the pressure difference DP in the steps S10, S13, S15 and S16 depends on the orientation of the sensor unit 4 in the wheel. Likewise the leading sign of the direction of movement DIR or of the acceleration ACC of the vehicle or vice versa can be defined, that is for example as direction of movement DIR less than zero if the vehicle is moving forwards. Alternatively for example the direction of movement DIR, the acceleration ACC, the temperature difference DT, the pressure difference DP or the first or second pressure P_1, P_2 can be checked in the steps S8 to S10 and S13 to S16 as to whether they undershoot or exceed a predetermined threshold value.

This application claims the priority, under 35 U.S.C. § 119, of German patent application No. 10 2004 039 405.9, filed Aug. 13, 2004; the entire disclosure of the prior application is herewith incorporated by reference.

I claim:

1. A sensor unit for recording a direction of rotation of a wheel, comprising:
a sensor recording a variable being characteristic of a direction of flow of an air stream in a tire of the wheel for assisting in determining the direction of rotation of the wheel.

2. The sensor unit according to claim 1:
wherein said sensor includes a first and a second temperature sensor; and
further comprising a heating element, said first and said second temperature sensor and said heating element are disposed so that for a first direction of flow, the air stream first passes over a surface of said first temperature sensor, then a surface of said heating element and subsequently a surface of said second temperature sensor and for a second direction of flow, the air stream first passes over said surface of said second temperature sensor then said surface of said heating element and subsequently said surface of said first temperature sensor.

3. The sensor unit according to claim 2, further comprising an air channel, said first and second temperature sensors and said heating element are disposed in said air channel which is embodied so that an air mass which flows over said first and second temperature sensors and said heating element is small.

4. The sensor unit according to claim 1, wherein said sensor includes a first Pitot chamber having a first pressure sensor disposed in said first Pitot chamber for determining a first pressure, said first Pitot chamber having a cutout formed therein and disposed so that the first pressure determined is dependent on the direction of flow of the air stream.

5. The sensor unit according to claim 4, wherein said sensor includes a second Pitot chamber having a second pressure sensor disposed in said second Pitot chamber for determining a second pressure, said second Pitot chamber having a second cutout formed therein and disposed so that the second pressure determined is dependent on the direction of flow of the air stream being opposite that of the direction of flow of the air stream in said first Pitot chamber.

6. The sensor unit according to claim 1, wherein said sensor has:
a first Pitot chamber;
a second Pitot chamber;
a common chamber wall between said first Pitot chamber and said second Pitot chamber; and
a differential pressure sensor disposed in said common chamber wall for determining a difference pressure between a first pressure in said first Pitot chamber and a second pressure in said second Pitot chamber depending on the direction of flow of the air stream.

7. A method for determining on which side of a vehicle a wheel is disposed, which comprises the steps of:
recording a variable being characteristic of a direction of flow of an air stream in a tire of the wheel;
recording a direction of movement of the vehicle;
recording an acceleration of the vehicle; and
determining the side of the vehicle on which the wheel is disposed, in dependence on the variable, the direction of movement of the vehicle, and the acceleration of the vehicle.

8. A device for determining on which side of a vehicle a wheel is disposed, the device comprising:
an evaluation unit determining a side of the vehicle in dependence on a variable being characteristic of a direction of flow of an air stream in the tire of the wheel, a direction of movement of the vehicle and an acceleration of the vehicle.

9. A sensor system for determining on which side of a vehicle a wheel is disposed, the sensor system comprising:
a sensor unit for recording a direction of rotation of a wheel, said sensor unit having sensors recording a variable being characteristic of a direction of flow of an air stream in a tire of the wheel, one of said sensors being disposed on each of the wheels of the vehicle; and
a device for determining on which side of the vehicle the wheel is disposed and receiving the variable from said sensor unit, said device having an evaluation unit embodied for determining the side of the vehicle in dependence the variable being characteristic of the direction of flow of the air stream in the tire of the wheel, a direction of movement of the vehicle and an acceleration of the vehicle.

* * * * *